United States Patent Office 3,576,881
Patented Apr. 27, 1971

3,576,881
PREPARATION OF MODIFIED OXO CATALYST
AND PROCESS RELATING THERETO
William L. Senn, Jr., Baton Rouge, La., assignor to Esso
Research and Engineering Company
No Drawing. Filed Feb. 4, 1966, Ser. No. 525,103
Int. Cl. C07c 45/10
U.S. Cl. 260—604
5 Claims

ABSTRACT OF THE DISCLOSURE

Complex metal carbonyl compounds having the generic formula: $M_2(CO)_6(XR_3)_2$ wherein M is iron, cobalt or rhodium, and preferably cobalt; X is phosphorus or arsenic, and preferably is phosphorus; and R is an alkyl or alkoxy radical having from about 1 to 20 carbon atoms are prepared by reacting at iron, cobalt or rhodium chelate with a biphyllic ligand in the presence of carbon monoxide and hydrogen at elevated temperatures and pressures. The complex metal carbonyl compounds are useful in promoting the reaction of carbon monoxide and hydrogen with olefins to aldehyde and alcohol products.

---

This invention relates to the preparation of complex metal carbonyl compounds, useful as oxo catalysts. More particularly, this invention relates to the preparation of oxo catalysts from metal chelates. In another aspect, this invention relates to the preparation of oxygenated organic compounds in the presence of oxo catalysts prepared from metal chelates.

The oxo reaction, known also as the hydroformylation reaction, is a process for introducing oxygen into organic compounds characterized by olefinic unsaturation. The reaction is carried out under conditions of elevated synthesis gas pressures, at elevated temperatures, and in the presence of a metal carbonyl catalyst. The utility of the oxo process for producing aldehydes and/or alcohols has fostered considerable research into methods of improving the economy and efficiency of the reaction. One fertile area for study has been the catalytic species used in promoting the reaction.

Oxo catalysts were initially of the metal carbonyl type, e.g. dicobalt octacarbonyl. Use of this type of catalyst resulted mostly in mixtures of straight and branched chain aldehydes, the selectivity of straight chain products being poor. Additionally, high pressures, e.g. 2000–4000 p.s.i.g., were required to maintain catalyst stability. A further disadvantage of using this type of catalyst resulted when alcohols were the desired product. The oxo aldehydes had to be hydrogenated in a separate zone with specific hydrogenation catalysts, in order to prepare alcohols. Thus, preparation of oxo alcohols required a costly two stage, high pressure process.

It was proposed to overcome these disadvantages by modifying the metal carbonyl catalyst with a biphyllic ligand, e.g. alkyl derivative of phosphorus, thereby stabilizing the catalyst. The preparation of this catalyst could be effected by either of two methods: (1) the metal carbonyl was reacted with a suitable biphyllic ligand at elevated temperatures to form an insoluble catalyst precursor, to the reaction mixture was added the olefinic feedstock to be oxygenated and an inert solvent medium, oxo reaction conditions were introduced and the insoluble catalyst precursor was slowly converted to the soluble active catalyst species which then promoted the oxo reaction; or, (2) the metal carbonyl was reacted with a suitable biphyllic ligand at elevated temperatures to form the insoluble catalyst precursor, the insoluble catalyst precursor was separated from the reaction mixture, slurried in an inert solvent and heated to convert it to the soluble active catalyst species, the active catalyst was then added to the oxo reaction zone. Since the oxo reaction is believed to occur through a homogeneous medium, the addition of a soluble catalyst to the oxo reaction zone is highly desirable. The steps required to prepare the soluble active catalyst may be illustrated by the following expressions:

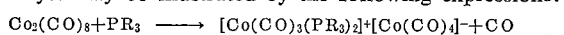

wherein $PR_3$ represents an alkyl or alkoxy derivative of phosphorus. The complex represented by I is the formula of the insoluble catalyst precursor; while II represents the active catalyst. The active catalyst may also be represented by the following structural formula:

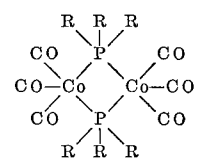

It should be understood, however, that the above-proposed formulae are merely illustrative of oxo catalysts and are not to be construed as limiting this invention in any way.

The modified oxo catalysts proved quite successful in increasing the yield of straight chain products and reducing the pressure necessary to stabilize the catalyst. Further, the modified catalyst proved to be a potent hydrogenation catalyst, obviating the necessity for a separate hydrogenation step and allowing the preparation of alcohols in a single stage system. However, several disadvantages were readily apparent in the preparation of the catalyst. These were such as to affect the results of the oxo reaction itself.

Regardless of the method used to prepare the catalyst, the metal carbonyls employed are relatively volatile and of a toxic nature, therefore, being difficult to handle. Further, the conversion of the insoluble catalyst precursor to the soluble active catalyst species involves a lengthy heating period, e.g. up to two hours or more for complete conversion. This lengthy heating period is a direct consequence of utilizing a heterogeneous reaction system for catalyst preparation, i.e. conversion of insoluble precursor to active form. As the active catalyst forms on the surface of the insoluble precursor, it is dissolved, exposing additional precursor to the reaction conditions. Consequently, the reaction mixture, although containing all of the insoluble precursor, effectively involves only a small portion of the insoluble precursor at any one time. Also, because of the insolubility of the precursor, large amounts of solvent were required in the conversion to the active species. This results in dilute catalyst solutions which in turn results in dilution of the oxo reaction mixture due to the necessarily large additions of catalyst solution to reach the proper metal content in the oxo reaction mixture. (A satisfactory oxo reaction normally requires catalyst concentrations corresponding to 0.01–1.0 wt. percent metal based on the olefinic feedstock.) Further, the volatility of the metal carbonyl coupled with the difficulty of completely converting the insoluble precursor to the active species, made the determination of metal concentration difficult and often inaccurate. Additionally, in the first method described above, the presence of the insoluble precursor in the reaction zone led to serious reactor fouling due to incomplete conversion and consequent clogging of lines and equipment by the remaining insoluble catalyst precursor. Although both methods described had their failings, it was advantageous to conduct the oxo reaction in a single step as in the former method, while it was also advantageous to add the soluble catalyst, as such, to the reaction zone as in the latter method.

One object of this invention, therefore, is to provide a process for conducting an oxo reaction that combines the advantages of the prior art while eliminating its disadvantages. It is another object of this invention to provide a homogeneous process for catalyst preparation whereby the metal carbonyl and insoluble precursor are by-passed in order to avoid the disadvantages of handling these compounds. It is still another object of this invention to provide a direct and economical process for preparing complex metal carbonyl compounds useful as oxo catalysts.

These objects may be accomplished in accordance with this invention as is hereinafter set forth and now briefly outlined: complex metal carbonyl compounds, useful as oxo catalysts, are directly prepared by reacting a transition metal chelate with a suitable biphyllic ligand under oxo reaction conditions. The reaction may be carried out with or without the presence of a solvent medium. When a solvent is utilized, an olefinic feedstock, suitable for oxygenating by the oxo process can be used. In this latter variation, the oxo reaction will start immediately upon the formation of the active catalyst. The use of the transition metal chelate to prepare the active catalyst allows a rapid and direct formation of the active catalyst. This result is due to the remarkably high degree of solubility of transition metal chelates in organic compounds. As mentioned, the oxo reaction is believed to take place in a homogeneous medium. Thus, the use of a highly soluble catalyst starting material allows the catalyst preparation also to take place in a homogeneous medium, facilitating the subsequent oxo reaction.

By the practice of this invention, the soluble active catalyst is prepared directly from the transition metal chelate and this conversion may be carried out utilizing the oxo olefinic feedstock as the solvent medium. Thus, the advantages of both prior art methods are obtained. Further, it is now possible to determine accurately the ratio of catalyst metal to olefinic feedstock. Additionally, the oxo reaction mixture need not be excessively diluted with catalyst solution. Even when the active catalyst is separately prepared in an inert solvent medium, the high degree of solubility of the transition metal chelates in organic solvents leads to relatively small additions of catalyst solution to the oxo reaction mixture in order to obtain the proper amount of transition metal in the oxo reaction mixture.

Exemplary of the solubility of transition metal chelates in various organic solvents are the data shown in the following table:

TABLE I

Solubility of cobaltic acetylacetonate

| Solvent: | Solubility [1] |
|---|---|
| Heptane | 0.5 |
| Benzene | 120.4 |
| Octene-1 | 2.0 |
| Tetrahydrofurane | 33.4 |

[1] In grams/liter at 75° F., one atmosphere pressure.

The process of this invention is applicable to the preparation of complex metal carbonyl compounds having the generic formula:

$$M_2(CO)_6(XR_3)_2$$

wherein M is a Group VIII transition metal selected from the group consisting of iron, cobalt, and rhodium, and preferably is cobalt; X is a Group V-A element selected from the group consisting of phosphorus and arsenic, and is preferably phosphorus; and, R is an alkyl or alkoxy radical having from about 1 to 20 carbon atoms and preferably 1 to 8 carbon atoms. The preferred form of the complex metal carbonyl compound may be represented as:

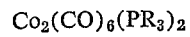

wherein R is an alkyl or alkoxy radical having 1 to 8 carbon atoms.

The soluble active catalyst is prepared by reacting a transition metal chelate with a biphyllic ligand under oxo reaction conditions. In general, the transition metal chelates will contain iron, cobalt or rhodium as the metal and a chelating agent. The chemistry of metal chelates is fully described in "Chemistry of the Metal Chelate Compounds," Martell and Calvin, Prentice-Hall, Inc., 1952. There, a metal chelate compound is characterized by the combination of a metal ion with an electron donor. The resulting substance is called a complex or coordination compound. If the substance which combines with the metal has two or more donor groups so that one or more rings are formed, the resulting structure is a chelate compound or metal chelate. The substance having the electron donors is then a chelating agent.

The number of chelate donor groups that can combine with a metal ion corresponds to the coordination number of that ion. Cobalt may exist as having a coordination number of 4 or 6, while iron and rhodium both have coordination numbers of 6. Since organic molecules may have more than two electron donor groups, the terms unidentate, bidentate, tridentate, quidridentate, etc., have been devised to denote complexes formed with molecules containing one, two, three, four, etc., donor groups. Obviously, complexes with unidentate donors do not form chelates. For example, a metal ion with a coordination number of 4 will bind two bidentate molecules or one quadridentate molecule. Similarly, a metal ion with a coordination number of 6 will bind three bidentate molecules or two tridentate molecules or one hexadentate molecule. Thus, a two ring metal chelate can be easily represented by the structural formula:

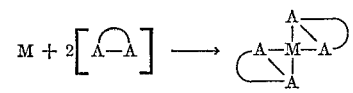

wherein M is a metal ion of coordination number 4, and A—A is a bidentate chelating agent, where A represents the electron donor. In a like manner, the three ring metal chelate formed between cobalt (coordination number of 6) and salicylaldehyde (bidentate chelating agent) may be shown as:

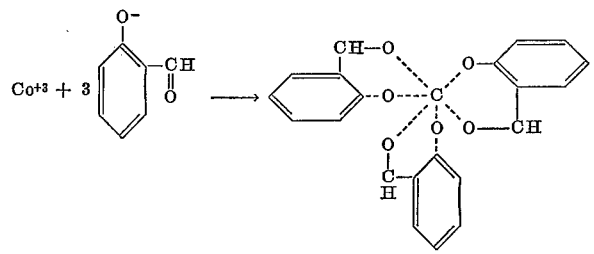

Cobaltic salicylaldehyde is an example of a metal chelate wherein oxygen is the electron donor, i.e. the coordination positions of cobalt are all taken up with oxygen atoms. The electron donors of greatest importance, and those that have been studied the most, are oxygen and nitrogen. Sulfur is also known to be electron donor for chelating agents but is somewhat restricted to biological processes. It is noteworthy to mention that other elements, e.g. the halogens, are electron donors, and that $H_2S$ and $NH_3$ are complexing agents; however, these materials lack the ability to form chelate rings. For the purposes of this invention, oxygen and nitrogen may each be used as electron donors (oxygen alone or nitrogen alone or a compound having oxygen and nitrogen donor groups may act as a chelating agent). Oxygen is particularly preferred as the donor since some nitrogen donor compounds tend to interact with active oxo catalyst in a deleterious fashion. However, these compounds are few and may be easily determined by experimentation. Examples of organic chelating agents having oxygen donor groups having from 5 to 10 carbon atoms are: acetylacetonates, salicylaldehydes, α-oxyacetophenones, α-nitroso-β-naphthols, and the like.

The transition metal chelates may be easily prepared by reacting the chelating agent with metal salts under suitable conditions. For example, cobaltic acetylacetonate may be prepared by oxidation of an aqueous solution of cobalt salt with hypochlorite ion in the presence of acetylacetone.

The transition metal chelate is reacted with a biphyllic ligand. The biphyllic ligands applicable to this invention may be represented by the following formula:

$$XR_3$$

wherein X is phosphorus or arsenic, and R is an alkyl or alkoxy radical having from 1 to about 20 carbon atoms. The order of preference of the alkyl or alkoxy radicals starts with groups containing the least number of carbon atoms, i.e. methyl, and decreases with increasing carbon atoms. However, groups containing from 1-8 carbon atoms are preferred. Biphyllic ligands having other than aliphatic groups, i.e. aromatic, cycloaliphatic, etc., do not form active catalyst species and are excluded from use. Thus, the biphyllic ligands contemplated by this invention are: phosphites, phosphonites, phosphines, arsites, arsenites, and arsines. The phosphines and phosphites are particularly preferred.

Generally, a stoichiometric amount of the biphyllic ligand based on the transition metal is employed. However, molar ratios of biphyllic ligand to transition metal may vary from 0.5 to 1 to about 5.0 to 1, but is preferably 1 to 1.

The oxo reaction, as known to the art, and as applicable to this invention, involves the addition of carbon monoxide and hydrogen to an olefinic linkage. Consequently, oxo reaction conditions may be broadly stated as those temperatures and synthesis gas (carbon monoxide and hydrogen, wherein one mole of synthesis gas is equal to one mole of carbon monoxide plus one mole of hydrogen) pressures that will facilitate the addition of carbon monoxide and hydrogen to the olefinic linkage. As will be described later, the preparation of the soluble catalyst from a transition metal chelate also involves the take up of carbon monoxide and hydrogen, and can be effected under normal oxo reaction conditions. The conditions under which carbon monoxide and hydrogen will add to an olefinic linkage, and under which the soluble catalyst may be prepared, may vary within wide limits and are not critical. Normally, temperatures ranging from about 200–500° F. may be employed with synthesis gas pressures ranging from about 300–3000 p.s.i.g. However, the best olefinic additions of carbon monoxide and hydrogen result at preferred oxo reaction conditions of temperatures of 325–375° F. and synthesis gas pressures of 500–1300 p.s.i.g. Therefore, since the oxonation reaction may proceed directly after the catalyst formation when an olefinic feedstock is present, these latter conditions are also preferred for preparation of the soluble active catalyst species. The molar ratio of hydrogen to carbon monoxide in the synthesis gas may also vary widely, from about 6:1 to 1:6, with a molar ratio of about 1.4:1 being preferred. The molar ratio of synthesis gas to olefinic feedstock is not critical but should be at least 1.5:1, and preferably at least 2.5:1.

Under these conditions, formation of the soluble active catalyst species is quite rapid, usually less than five minutes (as compared with approximately 2 hours for conversion of the insoluble precursor in prior art methods). It is believed that the surprisingly rapid reaction rate is due to dissociation of the metal chelate under oxo reaction conditions by hydrogenation of the chelating agent. The essentially bare metal atom is reduced in valence state and stabilized in the reduced valence state by complexation with phosphorous or arsenic ligands and with carbon monoxide. The stable complex so formed is the soluble active catalyst. By virtue of the homogeneous reaction phase and the now readily accessible coordination positions of the transition metal, the active catalyst forms rapidly.

The reaction to prepare the active catalyst is usually conducted in a solvent medium, although the transition metal chelate may be dissolved in the biphyllic ligand obviating the necessity for a solvent. The remarkable solubility of transition metal chelates allows the use of a wide variety of inert organic solvents: aromatics, such as benzene, toluene; paraffins, such as hexane, heptane, octane, dodecane; ethers, such as dioxanes or tetrahydrofuran; alcohols, such as pentanol or octanol; and naphthenes, such as cyclohexane or cyclopentane. In a preferred embodiment of this invention, the olefinic compound to be oxygenated in an oxonation reaction is utilized as the solvent for the preparation of the active catalyst. It is the high degree of solubility of the transition metal chelate that allows the olefinic feedstock to be used as the solvent. Normally, any olefin that can be used as a feedstock for the oxa reaction can be used as the solvent for preparing the active catalyst. Table I, shown above, indicates the solubility for cobaltic acetylacetonate in octene-1 (a typical hydroformylation reactant) as 2.0 g./l. This value corresponds to 0.05 wt. percent cobalt based on olefin at standard conditions, which is suitable for conducting the oxonation reaction. Examples of the olefinic feedstock include straight or branched chain olefinic compounds (depending on the desired product), monoolefins, diolefins, aryl-substituted olefins, cycloolefins, mixtures thereof, as well as polymers and copolymers thereof, and the like. Mixtures of olefins and hydrocarbon fractions which contain substantial quantities of olefins may also be used. The invention is particularly suitable to linear olefins, terminal and internal, containing 2 to about 20 carbon atoms per molecule, such as butene, hexene, octene, dodecene, and the like. For the purposes of this invention, an olefinic feedstock may be described as an organic compound possessing at least one nonaromatic carbon-carbon double bond.

When utilizing the olefinic feedstock as the solvent, the transition metal chelate, biphyllic ligand and solvent are added to a suitable reaction vessel. Transition metal chelate should be added in quantities sufficient to produce an active oxo catalyst having from 0.01–1.0 wt. percent transition metal based on the olefinic feedstock. A range of 0.1–0.5 wt. percent is preferred. The transition metal chelates involved are crystalline solids, and it sometimes is desirable to add the transition metal chelate to the reaction vessel in the liquid phase. In such circumstances, the transition metal chelate may be dissolved in small amounts of an inert organic solvent, such as those previously described. Oxo reaction conditions are then introduced into the reaction vessel causing the soluble active catalyst species to form rapidly. Without altering any conditions the oxygenation of the olefinic solvent will proceed immediately upon formation of the catalyst. Initiation of the oxo reaction will be recognized by a sudden, relatively large drop in pressure, indicating take up of carbon monoxide and hydrogen by the olefinic feedstock. Conversion of the olefinic feedstock is about 90% based on olefin charged. The catalyst may be recovered for reuse by a number of methods. It is preferred, however, to utilize the procedure of transferring the oxo reaction mixture to a flash distillation tower, at temperatures of about 100–300° F. and under pressures ranging from 0.001–1 atmosphere. Product and unconverted feed are flashed off overhead and condensed. The catalyst is recovered as a bottoms product.

When the catalyst is prepared utilizing solvents other than an olefinic feedstock, the same procedure is followed, except that the active catalyst must now be added to a separate oxonation reaction zone. Catalyst recovery will be the same as described above. When circumstances indicate the desirability of preforming the active catalyst, advantages will accrue from the small additions of catalyst to the oxo reaction mixture.

For purposes of this invention, a biphyllic ligand is understood to be a compound which contains an element having an electron pair that can form a coordination bond with a metal atom, the element being simultaneously capable of accepting electrons from the metal. The net effect produced thereby is to create a highly stable complex.

This invention will be further illustrated by the following examples. However, no limitations are to be implied from these examples, the only limitation residing in the claims.

EXAMPLE 1

An autoclave was charged with 1.54 g. of cobaltic acetylacetonate, 2.03 g. of trioctylphosphine and 100 g. of octene-1. The chelate was added in 10 ml. of benzene solution. The system was pressured to 1200 p.s.i.g. with synthesis gas (1.4/1, H/CO) and heated to 350° F. In about two minutes the solution changed in color from dark green to deep red signifying the conversion of the chelate to the active oxo catalyst. An infrared band at $5.15\mu$ characteristic of the oxo catalyst appeared. Immediate uptake of synthesis gas was noted indicating the oxo reaction was taking place. At the end of two hours, 58% conversion of the olefin to aldehydes and alcohols had been achieved. A gas chromatographic analysis of this product gave—

| Component: | Percent by wt. |
|---|---|
| Octene | 42.0 |
| iso-Aldehydes | 10.0 |
| n-Aldehyde | 17.8 |
| iso-Alcohols | 7.9 |
| n-Alcohol | 22.3 |

EXAMPLE 2

An autoclave was charged with 50 ml. of benzene, 0.51 g. of cobaltic acetylacetonate and 0.28 g. of triethylphosphite. The autoclave was pressured with synthesis gas ($H_2$ and CO) to 1200 p.s.i.g. The system was then heated to 340° F. where the solution changed from dark green to light red. Further heating at 350° F. gave first a dark red and then a dark brown. This species is active as an oxo catalyst.

EXAMPLE 3

An autoclave was charged with 1.8 g. of cobalt acetylacetonate in 100 ml. of heptane. This was a suspension as the concentration exceeded the solubility product for this chelate in heptane. Tributylphosphine (0.005 moles) was added and the system pressured with synthesis gas. The system was heated to 350° F. Between 350 and 375° F. the solution turned red. Infrared showed the presence of an absorption band at $5.16\mu$ that is characteristic of the active oxonation catalyst.

What is claimed is:

1. A process for oxonating an olefinic feedstock which comprises contacting an olefinic feedstock that functions as the liquid solvent medium in the reaction with a synthesis gas mixture containing carbon monoxide and hydrogen, a transition metal chelate wherein said transition metal is iron, cobalt or rhodium and the chelate portion of said transition metal chelate is formed of organic compounds containing an oxygen donor group and having from 5 to 10 carbon atoms, and a biphyllic ligand having the formula $XR_3$ wherein X is phosphorus or arsenic and R is an alkyl or alkoxy radical having from 1 to about 20 carbon atoms, said contacting being conducted at a temperature varying from 200 to 500° F. and a synthesis gas pressure varying from 300–3,000 p.s.i.g.

2. The process of claim 1 wherein the transition metal is cobalt and X is phosphorus.

3. The process of claim 1 wherein the chelate portion of the transition metal chelate is an acetylacetonate.

4. The process of claim 1 wherein the transition metal chelate is cobalt acetylacetonate.

5. The process of claim 2 wherein the biphyllic ligand is selected from the group consisting of phosphines and phosphites.

References Cited
UNITED STATES PATENTS

| 2,578,144 | 12/1951 | McMillan | 260—604 |
| 3,239,569 | 3/1966 | Slaugh et al. | 260—604X |
| 2,564,104 | 8/1951 | Gresham et al. | 260—604 |

BERNARD HELFIN, Primary Examiner

R. H. LILES, Assistant Examiner

U.S. Cl. X.R.

252—431; 260—598, 632